(12) United States Patent
Yuan et al.

(10) Patent No.: US 8,203,955 B2
(45) Date of Patent: Jun. 19, 2012

(54) METHOD AND APPARATUS FOR SCHEDULING PACKETS IN AN ORTHOGONAL FREQUENCY DIVISION MULTIPLE ACCESS (OFDMA) SYSTEM

(75) Inventors: Yifei Yuan, Livingston, NJ (US); Qi Bi, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 700 days.

(21) Appl. No.: 11/820,890

(22) Filed: Jun. 21, 2007

(65) Prior Publication Data

US 2008/0316928 A1    Dec. 25, 2008

(51) Int. Cl.
*G01R 31/08*    (2006.01)

(52) U.S. Cl. ...................................... 370/235

(58) Field of Classification Search .................. 370/337, 370/471, 203, 210, 212–215, 229–238, 278, 370/282, 310, 319–326, 395.4–395.51, 468, 370/473–477, 508, 536
See application file for complete search history.

(56) References Cited

U.S. PATENT DOCUMENTS

| | | | | |
|---|---|---|---|---|
| 6,963,534 | B1 * | 11/2005 | Shorey et al. | 370/230 |
| 7,027,392 | B2 * | 4/2006 | Holtzman et al. | 370/230 |
| 2005/0172199 | A1 * | 8/2005 | Miller et al. | 714/749 |
| 2005/0175013 | A1 * | 8/2005 | Le Pennec et al. | 370/395.42 |
| 2005/0207412 | A1 * | 9/2005 | Kawashima et al. | 370/389 |
| 2005/0254423 | A1 * | 11/2005 | Berghoff | 370/230.1 |
| 2005/0259661 | A1 * | 11/2005 | Ishii et al. | 370/395.4 |
| 2006/0030323 | A1 * | 2/2006 | Ode et al. | 455/436 |
| 2006/0120352 | A1 * | 6/2006 | Agashe et al. | 370/352 |
| 2006/0135193 | A1 * | 6/2006 | Ratasuk et al. | 455/522 |
| 2006/0146751 | A1 * | 7/2006 | Obuchi et al. | 370/331 |
| 2006/0268692 | A1 * | 11/2006 | Wright et al. | 370/229 |
| 2006/0268717 | A1 * | 11/2006 | Kanterakis | 370/235 |
| 2007/0064669 | A1 * | 3/2007 | Classon et al. | 370/347 |
| 2007/0116024 | A1 | 5/2007 | Zhang et al. | |
| 2007/0121538 | A1 * | 5/2007 | Ode et al. | 370/323 |
| 2007/0258404 | A1 * | 11/2007 | Tirkkonen et al. | 370/329 |
| 2007/0258458 | A1 * | 11/2007 | Kapoor | 370/394 |
| 2008/0056187 | A1 | 3/2008 | Soong et al. | |
| 2008/0117891 | A1 * | 5/2008 | Damnjanovic et al. | 370/345 |
| 2008/0137573 | A1 * | 6/2008 | Cave et al. | 370/310 |
| 2008/0232284 | A1 * | 9/2008 | Dalsgaard et al. | 370/310 |
| 2009/0225708 | A1 * | 9/2009 | Harada et al. | 370/329 |

FOREIGN PATENT DOCUMENTS

| | | |
|---|---|---|
| EP | 1 850 525 A1 | 10/2007 |
| EP | 1 906 548 A2 | 4/2008 |
| WO | WO 2006/102744 A1 | 10/2006 |
| WO | WO 2006/105004 A2 | 10/2006 |
| WO | WO 2007/124675 * | 4/2007 |
| WO | WO 2007/059196 A1 | 5/2007 |
| WO | WO2007/124675 A1 | 11/2007 |

(Continued)

OTHER PUBLICATIONS

Partial International Search.

(Continued)

*Primary Examiner* — Kwang B Yao
*Assistant Examiner* — Jung-Jen Liu
(74) *Attorney, Agent, or Firm* — Fay Sharpe LLP

(57) ABSTRACT

A method and apparatus for scheduling packets in an orthogonal frequency division multiple access (OFDMA) system is provided. More particularly, the presently described embodiments relate to a scheduling system whereby packets are prioritized based on packet delay information. The system also handles poor geometry users in an improved manner.

7 Claims, 3 Drawing Sheets

FOREIGN PATENT DOCUMENTS

WO     WO 2008/024890 A2     2/2008

OTHER PUBLICATIONS

Motorola, "System simulation results with non-static TTI," 3GPP TSG RAN1 LTE Ad Hoc, R1-061715, Cannes, France, pp. 1-8. Jun. 27-30, 2006.

Yikang Xiang et al., "Performance Impact of User Grouping on Fractional Power Loading in the OFDMA Downlink,"18th Annual IEEE International Symposium on Personal, Indoor and Mobile Radio Communications, XP031168697, pp. 1-5, Sep. 1, 2007.

Anna Tee et al, "Partial proposal on channel multiplexing—Presentation," Online, XP002515408, pp. 1-22, Mar. 13, 2007.

International Search Report.

\* cited by examiner

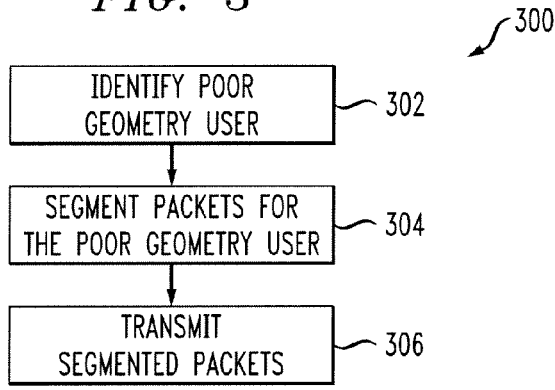
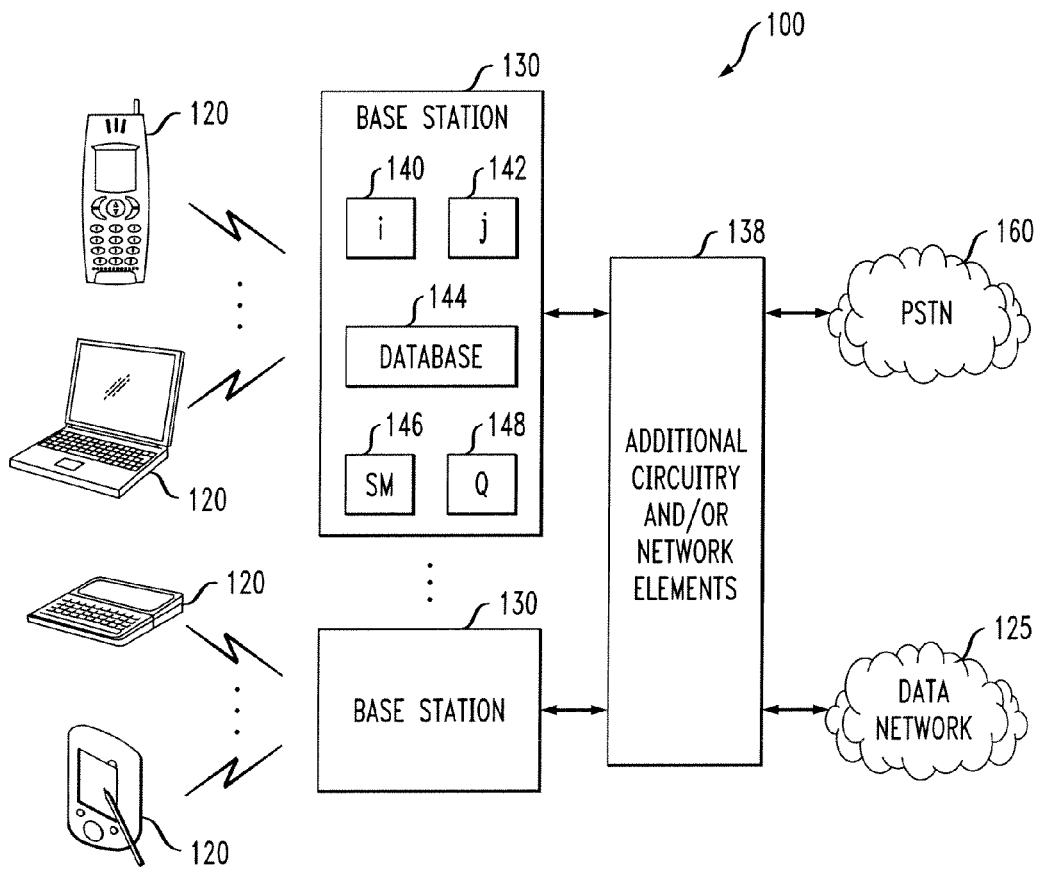

METHOD AND APPARATUS FOR SCHEDULING PACKETS IN AN ORTHOGONAL FREQUENCY DIVISION MULTIPLE ACCESS (OFDMA) SYSTEM

BACKGROUND OF THE INVENTION

This invention relates to a method and apparatus for scheduling packets in an orthogonal frequency division multiple access (OFDMA) system. More particularly, the presently described embodiments relate to a scheduling system whereby packets are prioritized based on packet delay information.

While the invention is particularly directed to the art of scheduling packets in an OFDMA environment, and will be thus described with specific reference thereto, it will be appreciated that the invention may have usefulness in other fields and applications. For example, the invention may be used in other environments where prioritizing packets is advantageous.

By way of background, OFDMA systems are utilized as an air interface in fourth generation (4G) systems for wireless communication. Where flexibility in providing bandwidth for multiple users is desired, OFDMA provides a solution. OFDMA requires that users be assigned to certain bandwidth designations, regardless of the needs of the users at a particular moment. So, the flexibility resides in the ability to serve more users at a given time. Scheduling the users on the system becomes important to manage the system effectively.

However, OFDMA systems have the capability to be used to transmit voice-over-internet-protocol (VOIP) calls. To minimize control signaling overhead, including signaling messages in OFDMA systems, an approach called persistent assignment is supported in Ultra Mobile Broadband (UMB) standard for VOIP applications. Persistent assignment is particularly useful where the number of simultaneously scheduled users in a sector is very high.

One implementation of persistent assignment scheduling is that, once a voice-over IP user begins a talk spurt, and is allocated with a resource unit, the user maintains the same resource unit until the end of the talk spurt. Also, the transmission format remains the same for all of the data transmitted until a persistent assignment expires.

To explain, with reference to FIG. 1, a frequency spectrum 10 is shown in an OFDMA system. As shown, the frequency spectrum includes pilot sub-carriers 12 as well as user data sub-carriers 14 and 16. For completeness, the guard bands 18 are also shown. It should be appreciated that the data sub-carriers or interlaces, are used to transmit data in the system. If persistent assignment is used, these sub-carriers are consistently used for a user during a, for example, a talk spurt.

A disadvantage of prior art of implementing voice-over IP in OFDMA systems is that the system does not take into account of packet delay when scheduling a new user. As a result, quality of service may suffer because higher priority calls may have to wait while the resources are used in a fixed manner in the OFDMA system.

As such, it is desirable to have a system whereby packets can be scheduled on a more efficient basis.

The present invention contemplates a new and improved that resolves the above-referenced difficulties and others.

SUMMARY OF THE INVENTION

A method and apparatus for scheduling packets that are known OFDMA system are provided.

In one aspect of the invention the method comprises determining if a packet is to be retransmitted, retransmitting the packet if it is to be retransmitted, if the packet is not to be retransmitted, determining if the packet is subject to a persistent assignment, if the packet is subject to persistent assignment, transmitting the packet using persistently assigned resources in a persistently assigned format and, if the packet is not subject to persistent assignment, prioritizing transmission of the packet based on packet delay information.

In another aspect of the invention, the prioritizing comprises scheduling a predetermined number of non-persistent users on a priority list.

In another aspect of the invention, the method further comprises determining whether a packet corresponds to a poor geometry user, and, segmenting the packet if the packet belongs to a poor geometry user.

In another aspect of the invention, retransmitting comprises retransmitting through a physical layer.

In another aspect of the invention, the method further comprises determining whether a user should be added to a persistent assignment list.

In another aspect of the invention, the method further comprises determining whether a maximum number of users have been assigned a priority based on delay.

In another aspect of the invention, the packet delay parameters are based on delay experienced by user for which packets are not being retransmitted or persistently assigned.

In another aspect of the invention, the method comprises determining whether a packet corresponds to a poor geometry user, segmenting the packet into smaller packets if the packet belongs to the poor geometry user, and, transmitting the segmented smaller packets.

In another aspect of the invention, the method further comprises prioritizing transmission of the packet based on packet delay information.

In another aspect of the invention, the method comprises determining whether a packet corresponds to a poor geometry user, segmenting the packet into smaller packets if the packet belongs to a poor geometry user, scheduling each segmented packet for transmission independently if the packet is segmented, determining if the packet is to be retransmitted, retransmitting the packet if it is to be retransmitted, if the packet is not to be retransmitted, determining if the packet is subject to a persistent assignment, if the packet is subject to persistent assignment, transmitting the packet using persistently assigned resources in a persistently assigned format, and, if the packet is not subject to persistent assignment, prioritizing transmission of the packet based on packet delay information.

In another aspect of the invention, the transmitting of the smaller segmented packets comprises prioritizing the transmission based on packet delay information.

In another aspect of the invention, retransmitting comprises retransmitting through a physical layer.

In another aspect of the invention, the method further comprises determining whether a user should be added to a persistent assignment list.

In another aspect of the invention, the method further comprises determining whether a maximum number of users have been assigned a priority based on delay.

In another aspect of the invention, the packet delay parameters are based on delay experienced by users for which packets are not being retransmitted or persistently assigned.

In another aspect of the invention, a means is provided to implement the methods described herein.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 is a flow chart illustrating the presently described embodiments.

FIG. 4 is a block diagram illustrating a system into which the presently described embodiments may be incorporated.

DETAILED DESCRIPTION

The presently described embodiments, in one form, are directed to a scheduling system for packets in an OFDMA environment. The system prioritizes transmission of packets based on delay information. The delay information relates to users and is readily available in the system. The system also handles poor geometry users in an improved manner.

More particularly, in one form, the system is operative to determine if a packet or packets for a user are to be retransmitted. If so, the packet(s) is retransmitted. If the packet(s) is not to be retransmitted but is subject to persistent assignment, the packet(s) is processed using persistently assigned resources in a persistently assigned format. In a case where the subject packet(s) is not to be retransmitted and is not subject to persistent assignment, the transmission of the packet(s) is prioritized based on packet delay information that is available within the system.

To further enhance the scheduling techniques of the presently described embodiments, a determination is made as to whether a particular packet corresponds to a poor geometry user. A poor geometry user is a user that is typically on the edge of a coverage area for a wireless network. Packets for such users are typically retransmitted more than four times and the packet delay would build up if the transmission format is not reduced. However, with the presently described embodiments, once a packet is determined to be a packet for a poor geometry user, the transmission format can be reduced via packet segmentation into smaller packets to keep the packet delay within certain bound.

Figure 1:
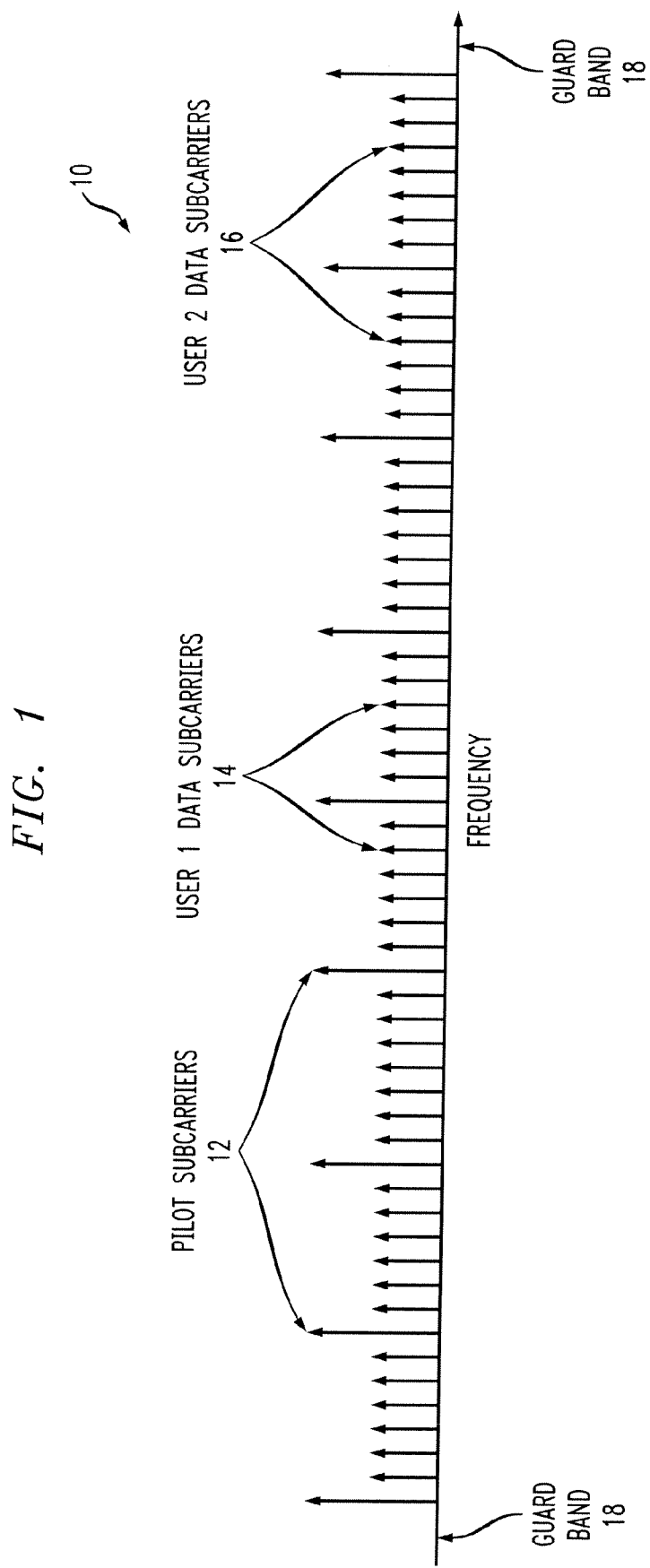
FIG. 1 illustrates a frequency spectrum for an OFDMA system.
Figure 2:
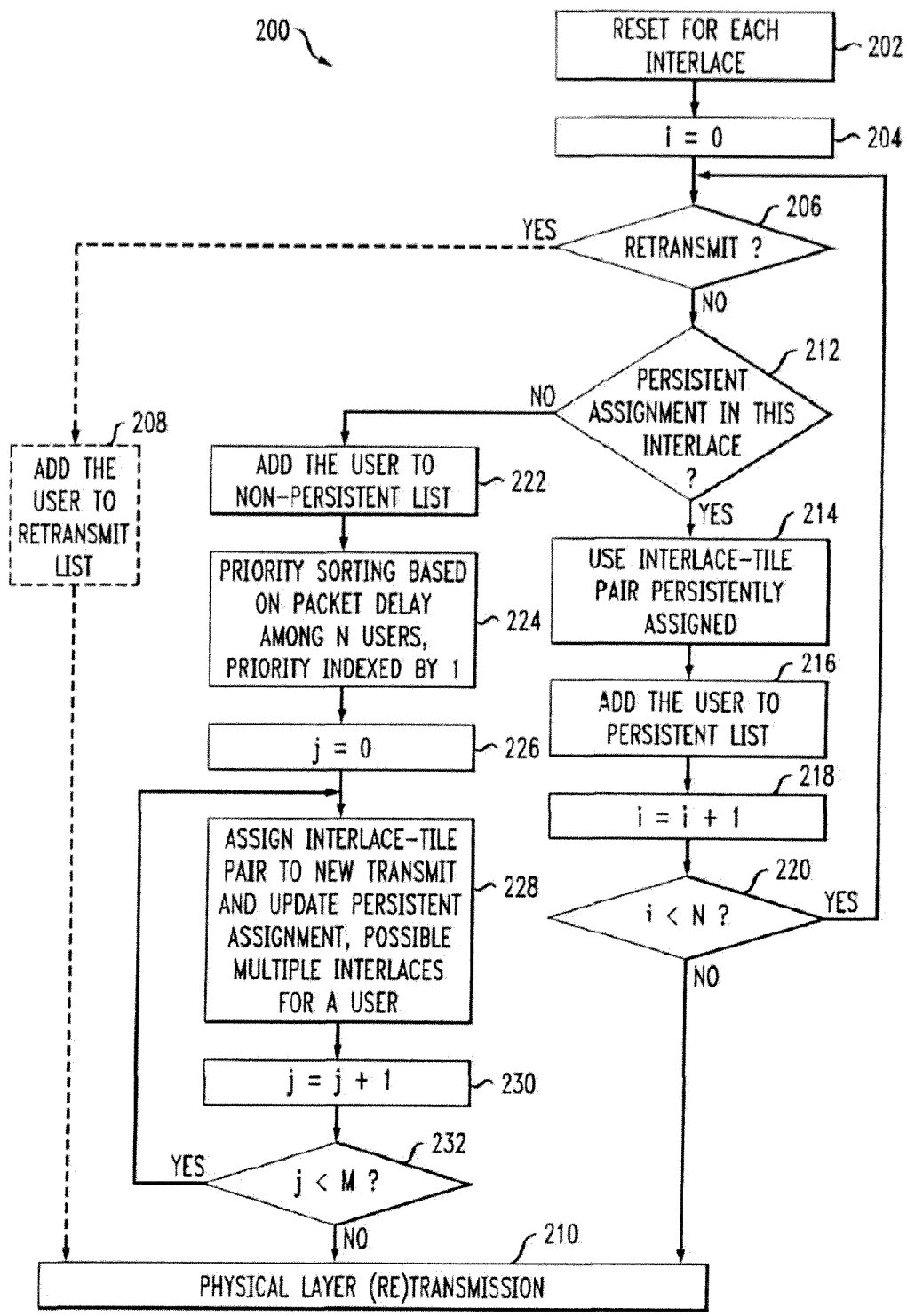
FIG. 2 is a flow chart illustrating the presently described embodiments.

Referring now to the drawings wherein the showings are for purposes of illustrating the exemplary embodiments only and not for purposes of limiting the claimed subject matter, FIG. 2 is a flow chart illustrating the presently described embodiments. It should be appreciated, however, that the methods according to the presently described embodiments may be implemented in a variety of suitable manners in a variety of suitable environments. For example, the methods of FIGS. 2 and 3 may be implemented using any of a number of acceptable software routines and/or hardware configurations. The resources that are used may be at least partially centralized or distributed throughout the network in an advantageous manner. In one form, the routines and appurtenant hardware according to the presently described embodiments may be implemented in a base station of the network, or may be implemented in a gateway-type device within the network or may be implemented in a Radio Network Controller (RNC) or similar device. Still further, the primary functionality of the system may be housed in the primary switching element of the network.

With reference to FIG. 4, a communications system 100 is illustrated, in accordance with one embodiment of the present invention. This represents only one example of a system into which the present application may be incorporated—the configuration of the system may well vary from one implementation to the next. For illustrative purposes, the communications system 100 of FIG. 4 is a wireless telephone system that employs a broadband data standard commonly known as cdma 2000 Evolution—Data Optimized (EV-DO), although it should be understood that the present invention may be applicable to other systems that support data and/or voice communication. The communications system 100 allows one or more mobile devices 120 to communicate with a data network 125, such as the Internet, and/or a public telephone system (PSTN) 160 through one or more base stations 130 and additional circuitry and/or network elements 138, such as a Radio Network Controller (RNC). The base stations 130 may take a variety of forms and may include a number of components and functionality not shown for convenience. For example, a physical layer is not specifically shown (but is shown in FIG. 2). However, in one form, as representatively shown for convenience, at least one of the base stations includes counters 140 and 142, a database 144, a scheduling module 146 and various queues 148. Both (or all) base stations in the network may take this form. It is to be understood that these element are shown to illustrate overall functionality and may take different forms and may even be disposed within different elements of the system. It should further be understood that the database may have stored therein a variety of information including lists (such as persistent assignment lists, retransmission lists and non-persistent assignment lists). These lists may be prioritized based on selected criteria (such as delay) and, of course, may be finite in length, allowing for a maximum number of users to be listed thereon. The queues 148 may be included in the database as well, but, at least in one form, maintain information on packet delay. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130. In this environment, the presently described embodiments, including those described in connection with FIGS. 2 and 3 (or combinations thereof), may be implemented in a variety of manners. For example, as noted above, the techniques described herein may be implemented within the base stations 130. The scheduling module 146 may be provided therein to provide scheduling functions and to control and conduct the techniques described herein by, among other things, accessing the other noted components of base stations 130.

Referring back now to FIG. 2, a flow chart illustrating a method 200 according to the presently described embodiments is shown. The method 200 is initiated by resetting each channel or interlace (at 202) at the beginning of a talk burst of a user (by, e.g., the scheduling module 146). This, of course, may be accomplished using any of a variety of suitable techniques. A counter "i" (e.g., counter 140 of FIG. 4) is initially set to zero (at 204). This counter is used to identify users 1 through N. It is then determined whether the packet or packets for the user are to be retransmitted (at 206). As is well known in the field, a packet may be re-transmitted for a variety of reasons. These reasons include, but are not limited to, situations where a "NO ACKOWLEDGE" or "NACK" message is received on behalf of a particular user. If the packet is to be retransmitted, the user is added to a re-transmission list (at 208), and the packet is retransmitted using the physical layer (at 210). The re-transmission list may be maintained in any known manner at a convenient location in the system including, for example, in the database 144. Also, the process of transmitting in this environment may be accomplished in any suitable manner through the physical layer.

If the packet or packets are not to be retransmitted, a determination is made as to whether a persistent assignment is to be used (at 212). If so, a persistent assignment is implemented to ultimately transmit the packet through the physical layer (at 214). As noted above, the technique of persistent assignment may be implemented by the OFDMA system to allow the same set of resources to be dedicated to a particular user for an amount of time to accommodate, for example, a talk burst of the user. By maintaining such resources and the message format, the amount of signaling is reduced.

The user is then added to a persistent assignment list (at 216). The persistent assignment list may be maintained in any known manner at a convenient location in the system including, for example, in the database 144. The counter "i" is incremented (at 218) once the processing for the user is complete. Recall that this counter identifies users. Then, it is determined whether "i" is less than "N", the total number of users in the sector, for example (at 220). If users still require processing, then steps 206 through 220 are repeated. If no users remain, the scheduling of persistently assigned users is completed and the packets are transmitted through the physical layer.

If the packet or packets are not to be retransmitted and not subject to persistent assignment, the user of the packet(s) is added to the non-persistent list (at 222). The list may be prioritized based on delay and have a finite number of entries. The non-persistent list may be maintained in any known manner at a convenient location in the system including, for example, in the database 144. The packet or packets is then sorted based on packet delay among a fixed group of users (at 224). Packets experiencing longer delays are given higher priority for transmission. Packet delay information may be maintained in the system in a variety of different manners. In one form, a packet queue (such as queue 148) maintains delay information for particular users. In another form, a database (e.g., database 144) in the system is updated with packet delay information. A counter "j" (e.g., counter 142) is set to zero (at 226). This counter keeps track of the number of non-persistent assignment messages in one interlace. In one form, the maximum number of non-persistent assignment messages for one interlace is "M." An interlace-tile pair is then assigned to transmit the packet (at 228) and the counter "j" is incremented (at 230). A determination is then made as to whether "j" is less than "M" (at 232). If so, steps 228-232 are repeated. If not, the scheduling is completed and, ultimately, physical layer transmission is completed (at 210).

In other forms of the presently described embodiments, a determination may be made before step 202 that a poor geometry user (described in more detail below) is involved in a transmission. That being the case, additional steps may be taken to ensure the desired cell coverage while maintaining the packet delay within certain bound.

In this regard, with reference to FIG. 3, a method 300 is illustrated. The method 300 is initiated by identifying a poor geometry user (at 302) (by, for example, element 138 of FIG. 4). Such identifying may be accomplished using a variety of suitable techniques, as a function of the network design. The techniques may include monitoring various parameters, such as signal strength, position, number of retransmissions, . . . etc. A poor geometry user is typically a user that is on the edge of a cell, or pico-cell, area or a user that is sufficiently blocked from the cell tower to make transmission to and/or from that user difficult. In these types of poor geometry circumstances, multiple retransmissions are typically experienced to achieve certain cell coverage. Such excessive number of retransmissions would cause unbounded packet delay buildup, which significantly impacts system performance. While extended frames have been previously used to solve the coverage problem, typical implementation requires complicated resource management across, for example, three time-contiguous interlaces, which imposes constraints on scheduling for data-VoIP mixed scenarios.

So, if a poor geometry user is identified, the packets for that user are segmented into smaller packets (at 304). The segmentation may take a variety of forms. In one form, however, a full-rate voice packet segmentation is carried out so users can take more time resources to meet packet delay requirements. Besides the lower transmission format that can be used to achieve certain cell coverage, each segmented packet can be treated independently in physical layer, thus allowing more efficient resource usage by the system. For example, with smaller packets, it is easier for the system to find suitable channels or interlaces upon which the packet can be transmitted. The segmented packets are then scheduled for transmission by, for example, the scheduling module 146 and transmitted (at 306).

It should be appreciated that the method described in connection with FIG. 3 is well suited for the method described in connection with FIG. 2 in a variety of manners. Both of them fit well with the dynamic resource allocation nature for data (including VoIP) packets in OFDMA systems, especially when a user enters talk spurt and is to be newly scheduled. In one form, the steps of identifying a poor geometry user (e.g. step 302) during the beginning of a talk spurt and segmenting the packets, if necessary (e.g. step 304), could be performed prior to the step of resetting each interlace (e.g. step 202). The smaller, segmented packets could then be prioritized, as in step 224, based on delay information before transmission. The physical layer transmission (at 210) could also be used instead of step 306.

It will be understood that the presently described embodiments provide many advantages. For example, more flexibility in frequency allocation may be experienced. Also, a simpler scheduling design can be achieved. Also, increased cell coverage may result from implementation of the presently described embodiments.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for scheduling packets in an orthogonal frequency division multiple access (OFDMA) system, the method comprising:
   determining whether a packet corresponds to a poor geometry user;
   segmenting the packet into smaller packets if the packet belongs to a poor geometry user;

scheduling each segmented packet for transmission independently;

if the packet is not segmented, determining if the packet is to be retransmitted;

retransmitting the packet if it is to be retransmitted;

if the packet is not to be retransmitted, determining if the packet is subject to a persistent assignment;

if the packet is subject to persistent assignment, transmitting the packet using persistently assigned resources in a persistently assigned format; and, if the packet is not subject to persistent assignment, prioritizing transmission of the packet based on packet delay information, wherein the prioritizing transmission comprises tracking a number of non-persistent assignment messages in an interlace; and transmitting the packet if the number of non-persistent assignment messages for the interlace is equal to a preset value.

2. The method as set forth in claim 1 wherein the transmitting of the smaller segmented packets comprises prioritizing the transmission based on packet delay information.

3. The method as set forth in claim 1 wherein retransmitting comprises retransmitting through a physical layer.

4. The method as set forth in claim 1 further comprising determining whether a user should be added to a persistent assignment list.

5. The method as set forth in claim 1 further comprising determining whether a maximum number of packets have been assigned a priority based on delay.

6. The method as set forth in claim 1 wherein the packet delay parameters are based on delay experienced by users for which packets are not being retransmitted or persistently assigned.

7. A system for scheduling packets in an orthogonal frequency division multiple access (OFDMA) system, the system comprising:

means for determining if a packet is to be retransmitted;

means for retransmitting the packet if it is to be retransmitted;

means for if the packet is not to be retransmitted, determining if the packet is subject to a persistent assignment;

means for if the packet is subject to persistent assignment, transmitting the packet using persistently assigned resources in a persistently assigned format; and, means for if the packet is not subject to persistent assignment, prioritizing transmission of the packet based on packet delay information, wherein the prioritizing transmission comprises tracking a number of non-persistent assignment messages in an interlace; and means for transmitting the packet if the number of non-persistent assignment messages for the interlace is equal to a preset value.

* * * * *